(12) United States Patent
Huang et al.

(10) Patent No.: US 12,441,181 B2
(45) Date of Patent: Oct. 14, 2025

(54) INTEGRATED DRIVE SYSTEM AND ELECTRIC VEHICLE

(71) Applicant: Robert Bosch GmbH, Stuttgart (DE)

(72) Inventors: Qilin Huang, Shanghai (CN); Luhan Zu, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 327 days.

(21) Appl. No.: 17/802,286

(22) PCT Filed: Mar. 2, 2021

(86) PCT No.: PCT/IB2021/051712
§ 371 (c)(1),
(2) Date: Aug. 25, 2022

(87) PCT Pub. No.: WO2021/209830
PCT Pub. Date: Oct. 21, 2021

(65) Prior Publication Data
US 2023/0142241 A1    May 11, 2023

(30) Foreign Application Priority Data
Mar. 3, 2020   (CN) .......................... 202010137982.4

(51) Int. Cl.
*B60K 17/14* (2006.01)
*B60K 17/04* (2006.01)
(Continued)

(52) U.S. Cl.
CPC .......... *B60K 17/046* (2013.01); *B60K 17/145* (2013.01); *F16D 65/092* (2013.01); *B60K 2007/0076* (2013.01)

(58) Field of Classification Search
CPC .. B60K 17/046; B60K 17/145; B60K 7/0007; B60K 2007/0076; F16D 65/092; B60Y 2200/14
See application file for complete search history.

(56) References Cited

U.S. PATENT DOCUMENTS 3,055,448 A   9/1962 Fagel
4,330,045 A * 5/1982 Myers ..................... F16D 55/22
                                                    475/900
(Continued)

FOREIGN PATENT DOCUMENTS

CN   101073985 A     11/2007
CN   106864251 A  *  6/2017  ........... B60K 17/046
(Continued)

OTHER PUBLICATIONS

International Search Report corresponding to PCT Application No. PCT/IB2021/051712, mailed Jul. 20, 2021 (Chinese and English language document) (7 pages).

*Primary Examiner* — Tinh Dang
(74) *Attorney, Agent, or Firm* — Maginot, Moore & Beck LLP

(57) ABSTRACT

An integrated drive system that includes a motor having a housing and an output shaft is disclosed. The integrated drive system further includes a planetary gear transmission mechanism having a first-stage planetary gear mechanism and a second-stage planetary gear mechanism. The first output torque of the first-stage planetary gear mechanism is transmitted to a driven object. The second output torque of the first-stage planetary gear mechanism is transmitted to the second-stage planetary gear mechanism. And the third output torque of the second-stage planetary gear mechanism is transmitted to the driven object. An electric vehicle that includes the described integrated drive system is also disclosed.

15 Claims, 2 Drawing Sheets

(51) Int. Cl.
*F16D 65/092* (2006.01)
*B60K 7/00* (2006.01)

(56) References Cited

U.S. PATENT DOCUMENTS

| | | | | |
|---|---|---|---|---|
| 2007/0267234 A1* | 11/2007 | Rogg | ................... | B60K 7/0015 |
| | | | | 180/65.51 |
| 2015/0133253 A1* | 5/2015 | Huang | ................. | B60K 7/0007 |
| | | | | 475/149 |
| 2015/0239527 A1* | 8/2015 | Huang | .................... | B62K 9/00 |
| | | | | 475/149 |
| 2016/0263987 A1* | 9/2016 | Brownell | ............. | B60K 7/0007 |

FOREIGN PATENT DOCUMENTS

| CN | 107128162 A | 9/2017 |
|---|---|---|
| WO | 2018/018868 A1 | 2/2018 |

\* cited by examiner

INTEGRATED DRIVE SYSTEM AND ELECTRIC VEHICLE

This application is a 35 U.S.C. § 371 National Stage Application of PCT/IB2021/051712, filed on Mar. 2, 2021, which claims the benefit of priority to Serial No. CN 2020 1013 7982.4, filed on Mar. 3, 2020 in China, the disclosures of which are incorporated herein by reference in their entirety.

The present application relates to the technical field of drive, in particular to an integrated drive system and an electric vehicle comprising same.

BACKGROUND

Electric vehicles can generally be driven in two ways. One is a centrally mounted conventional transmission system, in which an electric machine is mounted in the engine compartment and transmits torque to the wheels via a gearbox, a differential and a drive shaft, etc.; the other is an integrated drive system, in which an electric machine and gearbox are mounted together in or near the wheel. Compared with a conventional transmission system, the efficiency of an integrated drive system is markedly increased, e.g. by 20% or more, due to the elimination of the centrally mounted transmission system, and an integrated drive system also achieves modular design and independent control of the wheels, thus expanding the technical flexibility and feasibility of implementation of advanced driver assistance systems (ADAS) (e.g. automatic parking).

Existing integrated drive systems mainly use low-speed, high-torque electric machines; such electric machines have an external rotor connected to a wheel hub, and the output torque of the electric machine is transmitted directly to the wheel hub, so the rotation speed of the electric machine is the same as the rotation speed of the wheel. In general, the maximum rotation speed of the electric machine is about 1,500 r/min. External rotor electric machines have the disadvantages of low power density, high weight, large volume, severe NVH and a high cost, etc. This is unacceptable in systems with a higher rated power, because the corresponding electric machine dimensions and mass are greater, thereby increasing the unsprung mass of the vehicle and thus affecting the operability and comfort level of the vehicle. To overcome these shortcomings, an integrated drive system has appeared which uses an internal rotor electric machine and a single-stage planetary gearbox; this system can increase the power density of the drive electric machine, the weight of the electric machine can also be reduced slightly, and adverse effects caused by unsprung mass can also be reduced to a certain extent. However, in comparatively long buses or heavy trucks, this type of integrated drive system using an internal rotor electric machine and a single-stage planetary gearbox is unable to meet requirements completely, because the torque that needs to be transmitted to the wheels is very large and there is very limited space in the rims of the drive wheels.

As well as being used to drive the wheels of electric vehicles, integrated drive systems using the combination of an electric machine and a gearbox may also be used to drive other apparatuses, such as wheeled mobile machinery, transportation equipment, etc., and these are likewise affected by the shortcomings mentioned above.

Thus, there is a need for a new integrated drive system that is capable of meeting the requirements of a large transmission ratio, structural compactness and high load capacity.

SUMMARY

An objective of the present application is to provide an improved integrated drive system, to overcome the problems in the prior art.

To this end, according to one aspect of the present application, an integrated drive system is provided, comprising: an electric machine, comprising a housing and an output shaft; and a planetary gear transmission mechanism, comprising a first-stage planetary gear mechanism and a second-stage planetary gear mechanism, wherein a first output torque of the first-stage planetary gear mechanism is transmitted to a driven object, a second output torque of the first-stage planetary gear mechanism is transmitted to the second-stage planetary gear mechanism, and a third output torque of the second-stage planetary gear mechanism is transmitted to the driven object.

Optionally, the first-stage planetary gear mechanism comprises a first-stage sun gear, first-stage planet gears meshed with the first-stage sun gear, a first-stage ring gear meshed with the first-stage planet gears, and a first-stage planet gear carrier supporting the first-stage planet gears; and the second-stage planetary gear mechanism comprises a second-stage sun gear, second-stage planet gears meshed with the second-stage sun gear, a second-stage ring gear meshed with the second-stage planet gears, and a second-stage planet gear carrier supporting the second-stage planet gears; and the output shaft of the electric machine is fixedly connected to the first-stage sun gear, the first-stage planet gear carrier may be fixedly connected to the driven object, the first-stage ring gear is fixedly connected to the second-stage sun gear, the second-stage planet gear carrier is fixedly connected to the housing of the electric machine, and the second-stage ring gear may be fixedly connected to or integrally formed with the driven object.

Optionally, the first-stage planet gears are distributed uniformly around the first-stage sun gear in the circumferential direction, and the second-stage planet gears are distributed uniformly around the second-stage sun gear in the circumferential direction.

Optionally, the first-stage planet gears are supported on the first-stage planet gear carrier by means of first-stage planet gear shafts, and the second-stage planet gears are supported on the second-stage planet gear carrier by means of second-stage planet gear shafts.

Optionally, the first-stage ring gear is fixedly connected to the second-stage sun gear via a coupling plate.

Optionally, the driven object is a wheel.

Optionally, the wheel comprises a rim and a hub, the first-stage planet gear carrier may be fixedly connected to the rim or the hub, and the second-stage ring gear may be fixedly connected to or integrally formed with the rim.

Optionally, the wheel further comprises a cover plate, the cover plate being fixedly connected to the rim, and a brake disk being provided on the cover plate.

According to another aspect of the present application, an electric vehicle is provided, comprising: the integrated drive system described above; and a chassis on which the integrated drive system is mounted.

Optionally, the chassis is provided with a brake caliper which cooperates with the brake disk of the integrated drive system.

The integrated drive system of the present application employs a two-stage closed planetary gear transmission mechanism, and is capable of achieving a larger transmission ratio, thus allowing the use of a high-speed internal rotor electric machine with a maximum rotation speed as high as 10,000 r/min, and can also achieve the distribution of torque, to reduce the force acting on each gear and meet high torque output requirements, in order to increase service life.

BRIEF DESCRIPTION OF THE DRAWINGS

Exemplary embodiments of the present application are described in detail below with reference to the drawings. It should be understood that the embodiments described below are merely intended to explain the present application without limiting the scope thereof. In the drawings.

DETAILED DESCRIPTION

Figure 1:
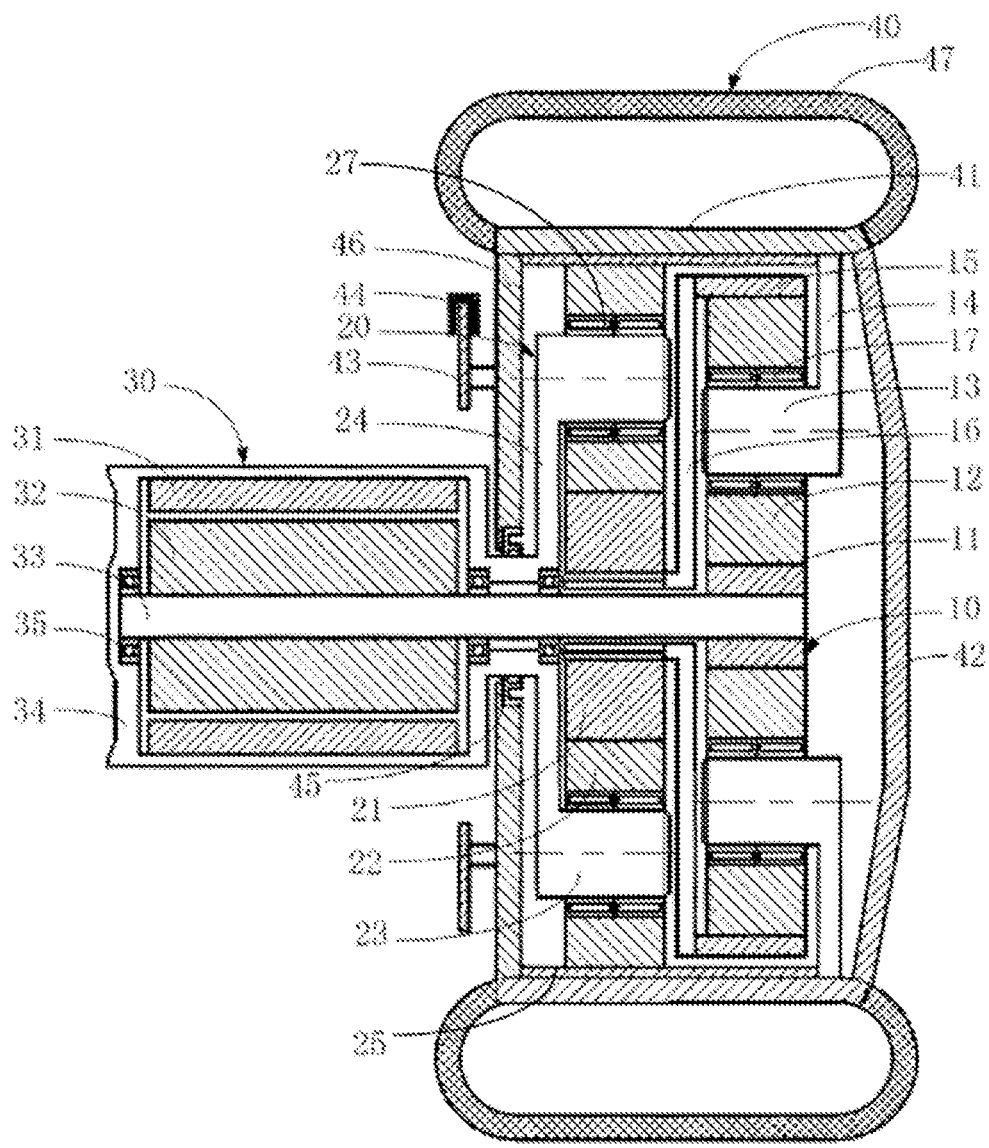
FIG. 1 is a schematic sectional view of an integrated drive system according to an embodiment of the present application.

Preferred embodiments of the present application are described in detail below with reference to examples. In the embodiments of the present application, the case of an integrated drive system for an electric vehicle is taken as an example to describe the present application. However, those skilled in the art should understand that these exemplary embodiments do not imply any limitation of the present application. The integrated drive system of the present application may also be used in other fields, such as wheeled mobile machinery, robots, transportation equipment, etc.

In the absence of conflict, features in the embodiments of the present application may be combined. In different drawings, identical or similar components are indicated with identical reference labels, and other components are omitted for conciseness, but this does not mean that the integrated drive system of the present application cannot include other components. It should be understood that the component sizes, proportional relationships and the number of components in the drawings do not limit the present application.

FIG. 1 shows schematically a sectional view of an integrated drive system according to an embodiment of the present application. As shown in FIG. 1, the integrated drive system of the present application substantially comprises an electric machine 30 and a planetary gear transmission mechanism, to impel a driven object to move. A wheel of an electric vehicle is taken as the driven object below to describe an embodiment of the present application. The driven object could of course also be another object, such as a transportation or winching drum.

Figure 2:
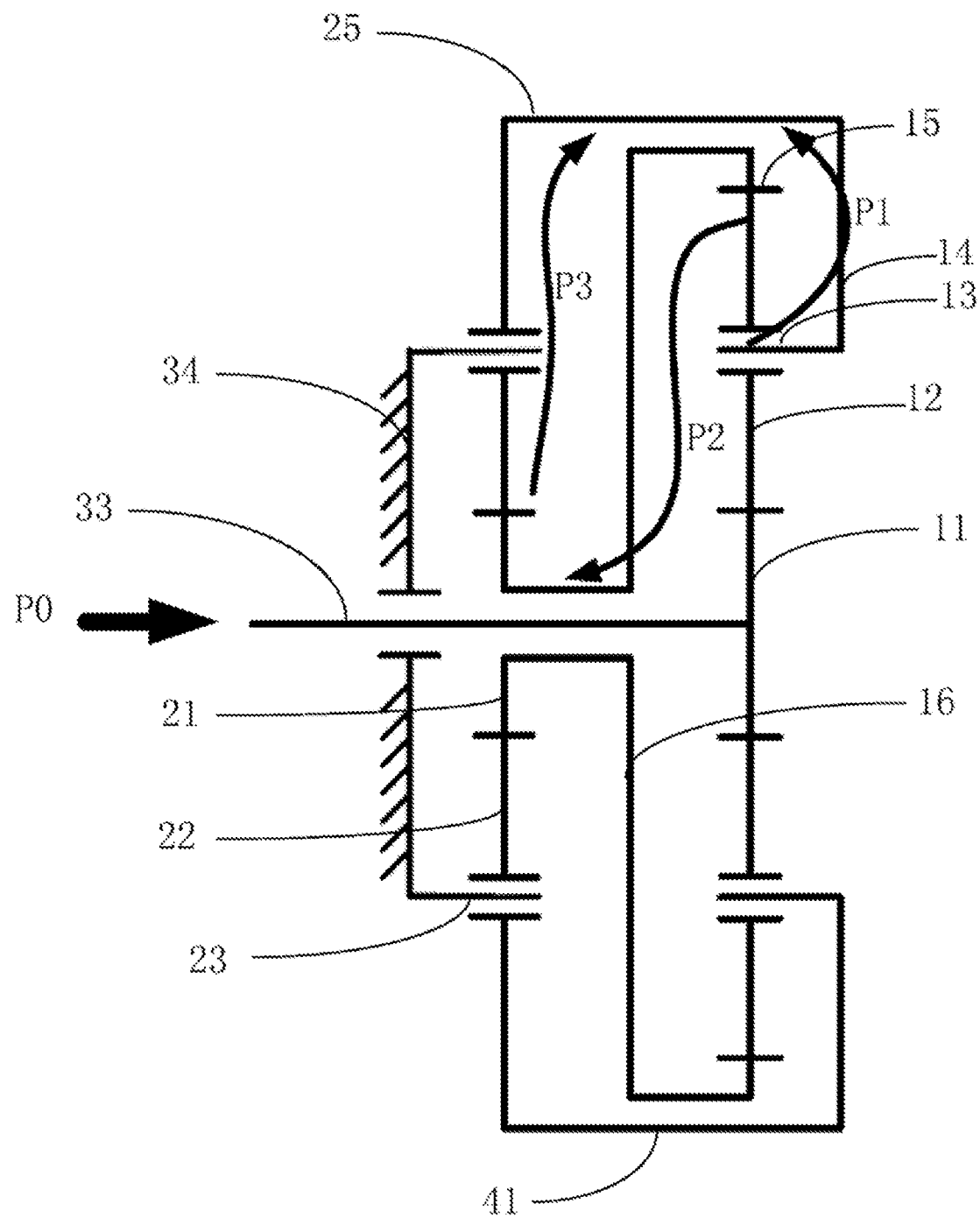
FIG. 2 is a schematic diagram of torque distribution in the integrated drive system shown in FIG. 1.

The wheel 40 comprises a rim 41 and a hub 42 (as force-bearing components of the driven object for example), the rim 41 and hub 42 forming a rigid support structure, and a tire 47 may be provided at an outer side of the rim 41. The electric machine 30 comprises a stator 31, a rotor 32, an output shaft 33 and a housing 34; the rotor 32 drives the output shaft 33 to rotate, to provide an electric machine torque P0 (shown in FIG. 2). Furthermore, the housing 34 comprises a bearing 35, to support the output shaft 33. The planetary gear transmission mechanism may be mounted in a space enclosed by the rim 41, or mounted close to rim 41. The planetary gear transmission mechanism comprises a two-stage planetary gear mechanism, i.e. a first-stage planetary gear mechanism 10 and a second-stage planetary gear mechanism 20, which form a closed two-stage planetary gear transmission mechanism. As shown in FIG. 2, a first output torque P1 of the first-stage planetary gear mechanism 10 is transmitted to the rim 41 or hub 42 of the wheel 40, a second output torque P2 is transmitted to the second-stage planetary gear mechanism 20, and a third output torque P3 of the second-stage planetary gear mechanism 20 is transmitted to the rim 41 or hub 42.

A larger transmission ratio can be achieved by two-stage planetary gear transmission, and a high-speed internal rotor electric machine with a maximum rotation speed of as high as 10,000 r/min can be used as the electric machine 30; additionally, torque distribution can be achieved, such that the electric machine torque P0 is distributed across the two-stage planetary gear mechanism, thus reducing the force acting on each gear, so high-torque output requirements can be met. Furthermore, service life can be increased and the amount of space taken up can be minimized.

According to an embodiment of the present application, as shown in FIG. 1, the first-stage planetary gear mechanism 10 comprises a first-stage sun gear 11, first-stage planet gears 12 meshed with the first-stage sun gear 11, a first-stage ring gear 15 meshed with the first-stage planet gears 12, and a first-stage planet gear carrier 14 supporting the first-stage planet gears 12. The second-stage planetary gear mechanism 20 comprises a second-stage sun gear 21, second-stage planet gears 22 meshed with the second-stage sun gear 21, a second-stage ring gear 25 meshed with the second-stage planet gears 22, and a second-stage planet gear carrier 24 supporting the second-stage planet gears 22. The output shaft 33 of the electric machine 30 is fixedly connected (e.g. by splines) to the first-stage sun gear 11, the first-stage planet gear carrier 14 may be fixedly connected to the rim 41, the first-stage ring gear 15 is fixedly connected to the second-stage sun gear 21, the second-stage planet gear carrier 24 is fixedly connected to the housing 34 of the electric machine 30, and the second-stage ring gear 25 may be fixedly connected to or integrally formed with the rim 41. It should be pointed out that the first-stage planet gear carrier 14 may also be fixedly connected to the hub 42. In this way, the rotation speed provided by the output shaft 33 of the electric machine 30 is reduced by means of the two-stage planetary gear mechanism, and the output torque PO provided is distributed between the first-stage planetary gear mechanism 10 and the second-stage planetary gear mechanism 20.

Two first-stage planet gears 12 and two second-stage planet gears 22 are shown in FIG. 1, but the number of planet gears in each stage is not limited, and may for example be 2, 3, 4 or more. The first-stage planet gears 12 may be distributed uniformly around the first-stage sun gear 11 in the circumferential direction, and the second-stage planet gears 22 may be distributed uniformly around the second-stage sun gear 21 in the circumferential direction.

As shown in FIG. 1, the first-stage planet gears 12 may be supported on the first-stage planet gear carrier 14 by means of first-stage planet gear shafts 13, and the second-stage planet gears 22 may be supported on the second-stage planet gear carrier 24 by means of second-stage planet gear shafts 23. Needle roller bearings 17 may be provided between the first-stage planet gears 12 and the first-stage planet gear shafts 13, and needle roller bearings 27 may be provided between the second-stage planet gears 22 and the second-stage planet gear shafts 23. The first-stage planet gear shafts 13 may be fixedly connected to the first-stage planet gear carrier 14, and the second-stage planet gear shafts 23 may be fixedly connected to the second-stage planet gear carrier 24. The first-stage ring gear 15 may be fixedly connected, for example by splines or another suitable connection means, to the second-stage sun gear 21 via a coupling plate 16.

In this way, the output shaft 33 (providing the electric machine torque PO) drives the first-stage sun gear 11, the first-stage sun gear 11 drives the first-stage planet gears 12, and the first-stage planet gears 12 drive the first-stage ring gear 15 (providing the first output torque P1), and drive the first-stage planet gear carrier 14 via the first-stage planet gear shafts 13 (providing the second output torque P2). The first-stage planet gear carrier 14 then drives the second-stage sun gear 21, the second-stage sun gear 21 drives the second-stage planet gears 22, and the second-stage planet gears 22 drive the second-stage ring gear 25 (providing the third output torque P3). Because the second-stage planet gear carrier 24 is fixedly connected to the housing 34 of the electric machine 30, the second-stage planet gears 22 only drive the second-stage ring gear 25. In this way, the distribution of torque across the two-stage planetary gear mechanism is achieved.

When the planetary gear transmission mechanism is mounted in the space enclosed by the rim 41 of the wheel 40, the wheel 40 may further comprise a cover plate 46; one end of the cover plate 46 is fixedly connected to the rim 41, and another end forms a seal with the housing 34 of the electric machine 30 via a sealing member 45, thereby shielding or covering the planetary gear transmission mechanism. In addition, a brake disk 43 may be provided on the cover plate 46. When the integrated drive system is mounted on a vehicle, the brake disk 43 can cooperate with a brake caliper 44 mounted on the chassis (not shown) to brake the vehicle.

Furthermore, in the example shown in FIG. 1, the output shaft 33 passes through the second-stage sun gear 21 and is then connected to the first-stage sun gear 11, and the second-stage sun gear 21 can rotate freely on the output shaft 33. However, the first-stage planetary gear mechanism 10 and second-stage planetary gear mechanism 20 may also be arranged in other ways, for example with the output shaft 33 connected to the first-stage sun gear 11 directly, without needing to pass through the second-stage sun gear 21.

It should be pointed out that the integrated drive system shown in FIG. 1 is just one specific example capable of realizing the concept of the present application. The electric machine, planetary gear mechanism and wheel of the integrated drive system of the present application may also be arranged in other ways, for example with the planetary gear transmission mechanism mounted at a position close to the wheel instead of in the space enclosed by the rim, and the two-stage planetary gear mechanism in the planetary gear transmission mechanism may also be arranged in different ways, for example with left and right positions exchanged, as long as it is able to perform the abovementioned functions of speed reduction and torque distribution.

Design parameters such as the ratios of numbers of teeth of the various gears and ring gears of the planetary gear transmission mechanism can be determined according to parameters such as the electric machine rotation speed, the torque that needs to be transmitted and the ratio of torque distribution; no further details are provided here.

According to another embodiment of the present application, the present application further discloses an electric vehicle, comprising the abovementioned integrated drive system, and further comprising a chassis on which the integrated drive system can be mounted. Correspondingly, since the electric machine is mounted on the chassis, the second-stage planet gear carrier may also be fixed to the chassis directly.

During use, the integrated drive system of the present application may employ a high-speed internal rotor electric machine, the maximum rotation speed of which can be as high as 10,000 r/min, and the closed two-stage planetary gear speed reduction mechanism can achieve a larger transmission ratio to reduce the wheel rotation speed. Furthermore, this type of planetary gear transmission mechanism can achieve two-stage distribution of torque, thereby reducing the force acting on each gear, can increase input torque and thereby increase the vehicle's load capacity, and can increase service life and minimize the amount of space taken up.

The present application has been described in detail above with reference to particular embodiments. For example, an integrated drive system for an electric vehicle is taken as an example in preferred embodiments to describe the present application, but applications can be found not only in the field of electric vehicles but also in any drive system combining an electric machine with a gearbox. For example, the wheel could be replaced with another rotary component of a drum for example as the driven object.

The embodiments described above and shown in the drawings should all be understood as being exemplary, without limiting the present application. Those skilled in the art could make various alterations or amendments thereto without departing from the spirit of the present application, and all such alterations or amendments shall fall within the scope of the present application.

The invention claimed is:

1. An integrated drive system, comprising:
an electric machine having a housing and an output shaft;
a planetary gear transmission mechanism having a first-stage planetary gear mechanism and a second-stage planetary gear mechanism configured such that torque is distributed across the first-and second-stage planetary gear mechanisms; and
a wheel comprising a rim and a cover plate that is fixedly connected to the rim,
wherein the first-stage planetary gear mechanism is configured to output a first output torque that is transmitted to the wheel and a second output torque that is transmitted to the second-stage planetary gear mechanism,
wherein the second-stage planetary gear mechanism is configured to output a third output torque that is transmitted to the wheel,
wherein the planetary gear transmission mechanism is mounted in a space enclosed by the rim, and
wherein a brake disk is mounted on a side of the cover plate facing toward the electric machine.

2. An electric vehicle, comprising:
the integrated drive system as claimed in claim 1; and
a chassis on which the integrated drive system is mounted.

3. The integrated drive system as claimed in claim 1, wherein:
the first-stage planetary gear mechanism includes:
a first-stage sun gear,
first-stage planet gears meshed with the first-stage sun gear,
a first-stage ring gear meshed with the first-stage planet gears, and
a first-stage planet gear carrier supporting the first-stage planet gears,
the second-stage planetary gear mechanism includes:
a second-stage sun gear,
second-stage planet gears meshed with the second-stage sun gear,
a second-stage ring gear meshed with the second-stage planet gears, and
a second-stage planet gear carrier supporting the second-stage planet gears,
the output shaft of the electric machine is fixedly connected to the first-stage sun gear, the first-stage planet gear carrier is configured to be fixedly connected to the wheel, the first-stage ring gear is fixedly connected to the second-stage sun gear, the second-stage planet gear carrier is fixedly connected to the housing of the electric machine, and the second-stage ring gear is configured to be fixedly connected to or integrally formed with the wheel.

4. The integrated drive system as claimed in claim 3, wherein:

the first-stage planet gears are distributed uniformly around the first-stage sun gear in a circumferential direction, and the second-stage planet gears are distributed uniformly around the second-stage sun gear in the circumferential direction.

5. The integrated drive system as claimed in claim 3, wherein:

the first-stage planet gears are supported on the first-stage planet gear carrier by way of first-stage planet gear shafts, and the second-stage planet gears are supported on the second-stage planet gear carrier by way of second-stage planet gear shafts.

6. The integrated drive system as claimed in claim 3, wherein the first-stage ring gear is fixedly connected to the second-stage sun gear via a coupling plate.

7. The integrated drive system as claimed in claim 3, wherein:

the wheel further comprises a hub, the first-stage planet gear carrier is configured to be fixedly connected to the rim or the hub, and the second-stage ring gear is configured to be fixedly connected to or integrally formed with the rim.

8. An electric vehicle, comprising:

the integrated drive system as claimed in claim 1; and a chassis on which the integrated drive system is mounted, wherein the chassis includes a brake caliper which cooperates with the brake disk of the integrated drive system.

9. An integrated drive system, comprising:

an electric machine having a housing and an output shaft;

a planetary gear transmission mechanism having a first-stage planetary gear mechanism and a second-stage planetary gear mechanism; and a wheel comprising a rim and a cover plate that is fixedly connected to the rim, wherein:

a first output torque of the first-stage planetary gear mechanism is transmitted to the wheel, a second output torque of the first-stage planetary gear mechanism is transmitted to the second-stage planetary gear mechanism, a third output torque of the second-stage planetary gear mechanism is transmitted to the wheel, the first-stage planetary gear mechanism includes:

a first-stage sun gear, first-stage planet gears meshed with the first-stage sun gear, a first-stage ring gear meshed with the first-stage planet gears, and a first-stage planet gear carrier supporting the first-stage planet gears, the second-stage planetary gear mechanism includes:

a second-stage sun gear, second-stage planet gears meshed with the second-stage sun gear, a second-stage ring gear meshed with the second-stage planet gears, and a second-stage planet gear carrier supporting the second-stage planet gears, the output shaft of the electric machine is fixedly connected to the first-stage sun gear, the first-stage planet gear carrier is configured to be fixedly connected to the wheel, the first-stage ring gear is fixedly connected to the second-stage sun gear, the second-stage planet gear carrier is fixedly connected to the housing of the electric machine, the second-stage ring gear is configured to be fixedly connected to or integrally formed with the wheel, the planetary gear transmission mechanism is mounted in a space enclosed by the rim, and a brake disk is mounted on a side of the cover plate facing toward the electric machine.

10. The integrated drive system as claimed in claim 9, wherein:

the first-stage planet gears are distributed uniformly around the first-stage sun gear in a circumferential direction, and the second-stage planet gears are distributed uniformly around the second-stage sun gear in the circumferential direction.

11. The integrated drive system as claimed in claim 9, wherein:

the first-stage planet gears are supported on the first-stage planet gear carrier by way of first-stage planet gear shafts, and the second-stage planet gears are supported on the second-stage planet gear carrier by way of second-stage planet gear shafts.

12. The integrated drive system as claimed in claim 9, wherein the first-stage ring gear is fixedly connected to the second-stage sun gear via a coupling plate.

13. The integrated drive system as claimed in claim 9, wherein:

the wheel further comprises a hub, the first-stage planet gear carrier is configured to be fixedly connected to the rim or the hub, and the second-stage ring gear is configured to be fixedly connected to or integrally formed with the rim.

14. An electric vehicle comprising:

the integrated drive system as claimed in claim 9; and a chassis on which the integrated drive system is mounted, wherein the chassis includes a brake caliper which cooperates with the brake disk of the integrated drive system.

15. An electric vehicle, comprising:

the integrated drive system as claimed in claim 9; and a chassis on which the integrated drive system is mounted.

* * * * *